United States Patent
Kim et al.

(10) Patent No.: US 12,032,241 B2
(45) Date of Patent: Jul. 9, 2024

(54) DISPLAY APPARATUS AND LIGHT SOURCE APPARATUS INCLUDING AN OPTICAL MEMBER

(71) Applicant: SAMSUNG ELECTRONICS CO., LTD., Suwon-si (KR)

(72) Inventors: Hyungsuk Kim, Suwon-si (KR); Kyungsoo Park, Suwon-si (KR); Hyungjin Kim, Suwon-si (KR); Kyehoon Lee, Suwon-si (KR); Junsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/993,617

(22) Filed: Nov. 23, 2022

(65) Prior Publication Data

US 2023/0244104 A1 Aug. 3, 2023

Related U.S. Application Data

(63) Continuation of application No. PCT/KR2022/016421, filed on Oct. 26, 2022.

(30) Foreign Application Priority Data

Jan. 28, 2022 (KR) .......................... 10-2022-0013555

(51) Int. Cl.
  *G02F 1/13357* (2006.01)
  *G02F 1/1335* (2006.01)
(52) U.S. Cl.
  CPC .................. *G02F 1/133603* (2013.01); *G02F 1/133605* (2013.01); *G02F 1/133607* (2021.01); *G02F 1/133608* (2013.01)

(58) Field of Classification Search
  CPC ......... G02F 1/133603; G02F 1/133605; G02F 1/133607; G02F 1/133608
  See application file for complete search history.

(56) References Cited

U.S. PATENT DOCUMENTS 8,061,863 B2  11/2011 Min
8,829,776 B2  9/2014 Yamamoto et al.
(Continued)

FOREIGN PATENT DOCUMENTS

CN  104479364 A  4/2015
JP  2012-204370 A  10/2012
(Continued)

OTHER PUBLICATIONS

Communication dated Feb. 10, 2023, issued by the International Searching Authority in counterpart International Application No. PCT/KR2022/016421 (PCT/ISA/210).
(Continued)

*Primary Examiner* — Tracie Y Green
(74) *Attorney, Agent, or Firm* — Sughrue Mion, PLLC

(57) ABSTRACT

Disclosed herein is a display apparatus and a light source apparatus thereof. The light source apparatus includes an optical member; a substrate disposed on a first side of the optical member; and a supporter disposed between the optical member and the substrate, wherein the supporter comprises: a supporter body on the substrate; and a protective member disposed at a first end of the supporter body that is nearest to the optical member, the protective member comprising a material having at least one of stretchability and elasticity.

19 Claims, 11 Drawing Sheets

(56) References Cited

U.S. PATENT DOCUMENTS

| | | |
|---|---|---|
| 2002/0044437 A1 | 4/2002 | Lee |
| 2011/0149598 A1* | 6/2011 | Min .................. G02F 1/133608 |
| | | 362/382 |
| 2012/0243261 A1* | 9/2012 | Yamamoto ........ G02F 1/133603 |
| | | 362/613 |
| 2017/0009960 A1* | 1/2017 | Ahn .................. G02F 1/133608 |
| 2019/0187518 A1* | 6/2019 | Her .................. G02F 1/133611 |

FOREIGN PATENT DOCUMENTS

| | | |
|---|---|---|
| JP | 2017-157278 A | 9/2017 |
| KR | 10-1081156 B1 | 11/2011 |
| KR | 10-2020-0028554 A | 3/2020 |
| KR | 10-2237160 B1 | 4/2021 |
| KR | 10-2300505 B1 | 9/2021 |

OTHER PUBLICATIONS

Communication dated Feb. 10, 2023, issued by the International Searching Authority in counterpart International Application No. PCT/KR2022/016421 (PCT/ISA/237).

\* cited by examiner

DISPLAY APPARATUS AND LIGHT SOURCE APPARATUS INCLUDING AN OPTICAL MEMBER

CROSS-REFERENCE TO RELATED APPLICATION(S)

This application is a bypass continuation application of international application No. PCT/KR2022/016421, filed on Oct. 26, 2022, which claims priority to Korean Patent Application No. 10-2022-0013555, filed on Jan. 28, 2022, in the Korean Intellectual Property Office, the disclosure of which is incorporated by reference herein in its entirety

BACKGROUND

1. Field

The disclosure relates to a display apparatus and a light source apparatus thereof, and more particularly, to a display apparatus including an optical sheet and a light source apparatus thereof.

2. Description of Related Art

A display apparatus is an apparatus that converts obtained or stored electrical information into visual information and displays the visual information to a user, and the display apparatus is used in various fields, such as home or workplace.

A display apparatus may include a monitor apparatus connected to a personal computer, a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, and/or various kinds of audio/video systems.

A display apparatus may include a light source apparatus to convert electrical information into visual information, and the light source apparatus may include a plurality of light sources configured to independently emit light.

Each of the plurality of light sources may include a light emitting diode (LED) or an organic light emitting diode (OLED). For example, the LED or the OLED may be mounted on a circuit board and/or a substrate.

SUMMARY

An aspect of the disclosure includes a display apparatus capable of preventing damage to an optical member, and a light source apparatus thereof.

It is another aspect of the disclosure to provide a display apparatus capable of reducing a Mura defect and a light source apparatus thereof.

Additional aspects of the disclosure will be set forth in part in the description which follows and, in part, will be obvious from the description, or may be learned by practice of the disclosure.

According to embodiments of the disclosure, a light source apparatus includes: an optical member; a substrate disposed on a first side of the optical member; and a supporter disposed between the optical member and the substrate, wherein the supporter includes: a supporter body on the substrate; and a protective member disposed at a first end of the supporter body that is nearest to the optical member, the protective member comprising a material having at least one of stretchability and elasticity.

The supporter body may include a material having a strength that is greater than a strength of a material of the protective member.

The protective member may include a material having thixotrophy.

The protective member may include at least one of a transparent material and a translucent material.

The supporter body may include a columnar shape in which a cross-sectional area, along a direction in which the substrate extends, is reduced from the substrate toward the optical member.

The supporter body may include: a first supporter disposed adjacent to the substrate; and a second supporter spaced a first distance from the substrate, the second supporter comprising a cross-sectional area less than a cross-sectional area of the first supporter along a direction in which the substrate extends.

The light source apparatus may include a light emitting diode mounted on the substrate; and an optical dome configured to cover the light emitting diode, the optical dome comprising a material that is same as a material of the protective member.

The protective member may be configured to allow light emitted from the light emitting diode to pass through.

The light source apparatus may include a reflective sheet disposed on a first side of the substrate, the reflective sheet comprising a through hole formed to correspond to the optical dome and a supporter hole formed to correspond to the supporter.

The optical member may include at least one of a diffuser plate, a diffusion sheet, a prism sheet, and a reflective polarizing sheet.

The supporter body may include a body groove in which the protective member is disposed.

The protective member may include a hemispherical shape protruding from the supporter body toward the optical member.

According to embodiments of the disclosure, a display apparatus includes: a bottom chassis; a substrate on the bottom chassis; a light emitting diode mounted on the substrate; an optical dome configured to cover the light emitting diode; an optical member disposed on a first side of the substrate; and a supporter disposed between the optical member and the substrate, wherein the supporter includes: a supporter body on the substrate; and a protective member disposed at a first end of the supporter body that is nearest to the optical member, the protective member comprising a material that is same as a material of the optical dome.

The supporter body may include a material having a strength that is greater a strength of a material of the protective member.

The protective member may include a material having thixotrophy.

According to embodiments of the disclosure, a light source apparatus includes: an optical member; a light emitting diode disposed between the optical member and a substrate; a supporter disposed between the optical member and the substrate, wherein the supporter includes: a supporter body; and a protective member disposed at a first end of the supporter body that is nearest to the optical member.

The light source apparatus may include a reflective sheet disposed on a first side of the substrate; and an optical dome spaced a first distance from the reflective sheet, wherein the optical dome may be configured to enclose the light emitting diode.

A material of the optical dome may include at least one of a silicone and a resin.

The supporter body may include a first supporter body and a second supporter body, and wherein the first supporter body may include a different geometric shape than the second supporter body.

The first supporter body may be a cylindrical shape and the second supporter body may be a rectangular shape.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
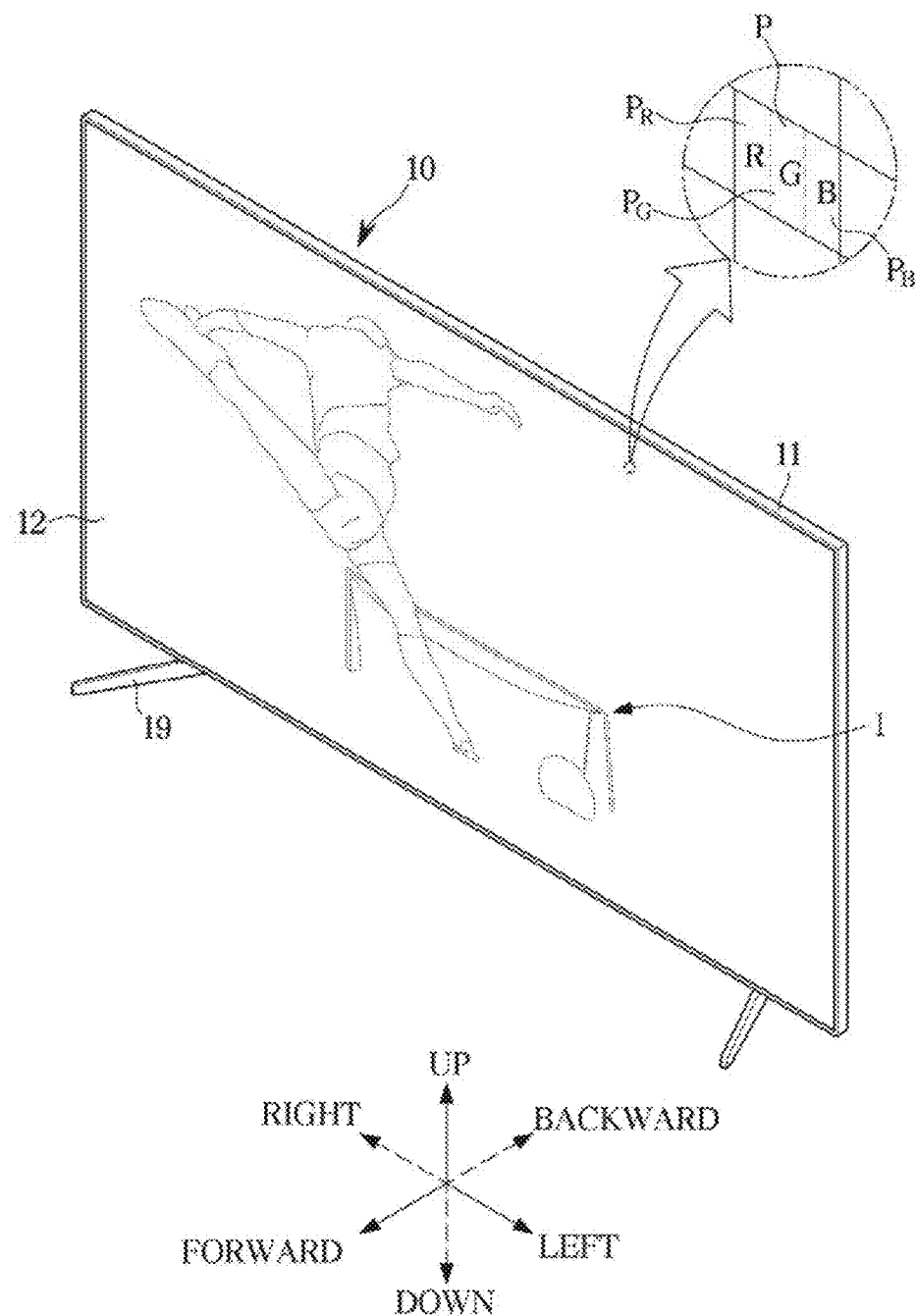
FIG. 1 is a view of an appearance of a display apparatus, according to an embodiment.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings.

FIG. 1 is a view illustrating an appearance of a display apparatus according to an embodiment.

A display apparatus 10 is a device that processes an image signal received from the outside and visually displays the processed image. Hereinafter a case in which the display apparatus 10 is a television is exemplified, but the disclosure is not limited thereto. For example, the display apparatus 10 may be implemented in various forms, such as a monitor, a portable multimedia device, and a portable communication device, and the display apparatus 10 is not limited in its shape as long as visually displaying an image.

The display apparatus 10 may be a large format display (LFD) installed outdoors, such as a roof of a building or a bus stop. Outdoors is not limited to the outside of a building; thus the display apparatus 10 according to an embodiment may be installed in any place that is accessed by a large number of people. For example, the display apparatus may be indoors, such as subway stations, shopping malls, movie theaters, companies, and stores.

The display apparatus 10 may receive content data including video data and audio data from various content sources and output video and audio corresponding to the video data and the audio data. For example, the display apparatus 10 may receive content data through a broadcast reception antenna or cable, receive content data from a content playback device, or receive content data from a content providing server of a content provider.

As illustrated in FIG. 1, the display apparatus 10 includes a main body 11, a screen 12 provided to display an image I, and a supporting member 19 provided below the main body 11 to support the main body 11.

The main body 11 may form an appearance of the display apparatus 10, and the main body 11 may include a component configured to allow the display apparatus 10 to display the image I and to perform various functions. Although the main body 11 shown in FIG. 1 is in the form of a flat plate, the shape of the main body 11 is not limited thereto. For example, the main body 11 may have a curved plate shape.

The screen 12 may be formed on a front surface of the main body 11, and display the image I. For example, the screen 12 may display a still image or a moving image. Further, the screen 12 may display a two-dimensional plane image or a three-dimensional image using binocular parallax of the user.

A plurality of pixels P may be formed on the screen 12 and the image I displayed on the screen 12 may be formed by a combination of the lights emitted from the plurality of pixels P. For example, the image I may be formed on the screen 12 by combining light emitted from the plurality of pixels P as a mosaic.

Each of the plurality of pixels P may emit different brightness and different color of light. In order to emit different brightness of light, each of the plurality of pixels P may include a self-luminous panel (for example, a light emitting diode panel) configured to directly emit light or a non-self-luminous panel (for example, a liquid crystal panel) configured to transmit or block light emitted by a light source apparatus.

In order to emit light in the various colors, the plurality of pixels P may include sub-pixels $P_R$, $P_G$, and $P_B$.

The sub-pixels $P_R$, $P_G$, and $P_B$ may include a red sub pixel $P_R$ emitting red light, a green sub pixel $P_G$ emitting green light, and a blue sub pixel $P_B$ emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel $P_R$, the green light of the green sub pixel $P_G$ and the blue light of the blue sub pixel $P_B$, each of the plurality of pixels P may emit different brightness and different color of light.

Figure 2:
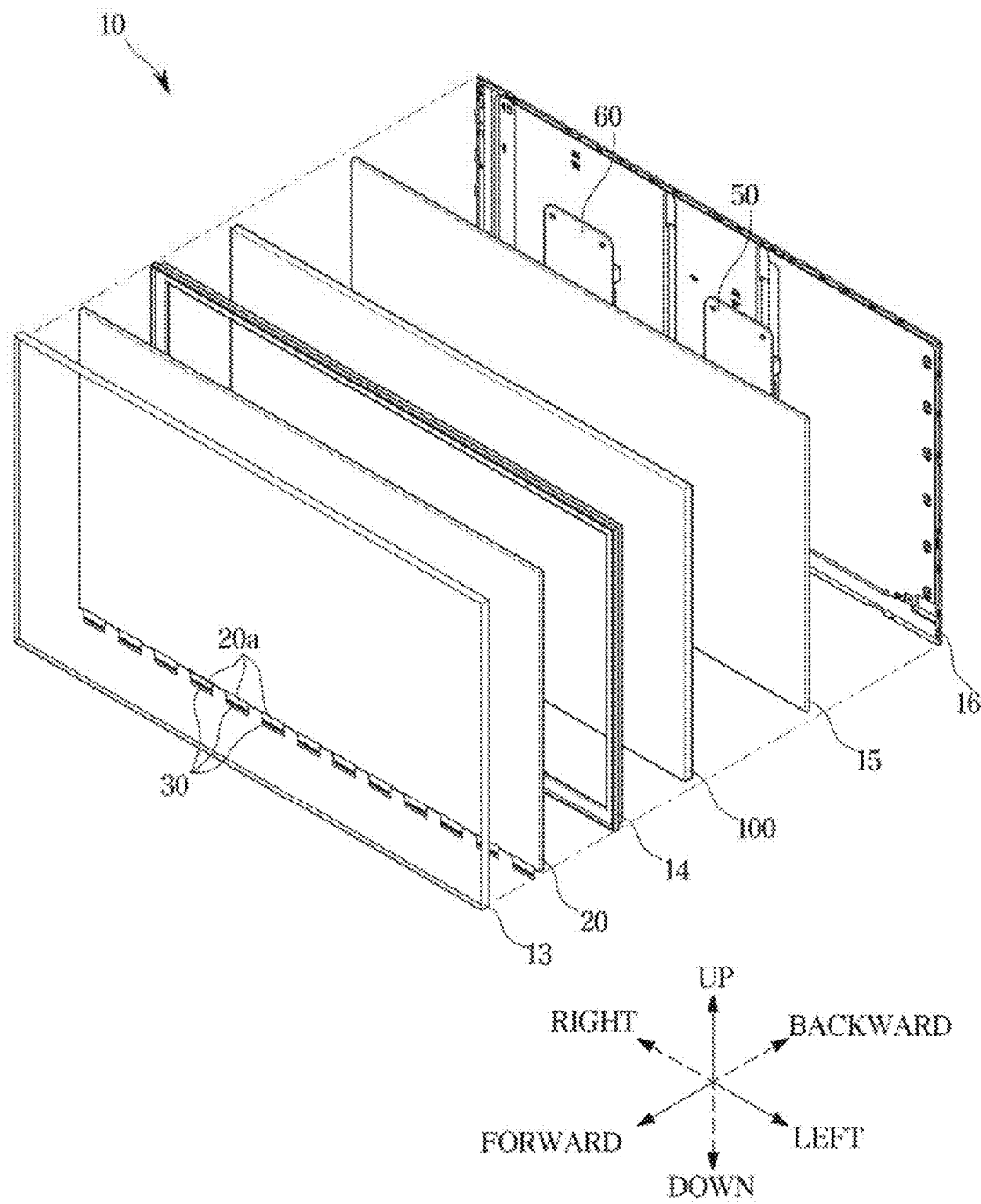
FIG. 2 is an exploded view of the display apparatus, according to an embodiment.

FIG. 2 is an exploded view of the display apparatus, according to an embodiment.

As shown in FIG. 2, various components configured to generate the image I on the screen may be provided inside the main body 11.

For example, the main body 11 includes a light source apparatus 100 that is a surface light source, a liquid crystal panel 20 configured to block or transmit light emitted from the light source apparatus 100, a control assembly 50 configured to control an operation of the light source apparatus 100 and the liquid crystal panel 20, and a power assembly 60 configured to supply power to the light source apparatus 100 and the liquid crystal panel 20. Further, the main body 11 includes a bezel 13, a frame middle mold 14, a bottom chassis 15 and a rear cover 16 which are provided to support and fix the liquid crystal panel 20, the light source apparatus 100, the control assembly 50 and the power assembly 60.

A cable 20a configured to transmit image data to the liquid crystal panel 20, and a display driver integrated circuit (DDI) (hereinafter referred to as 'driver IC') 30 configured to process digital image data and output an analog image signal are provided at one side of the liquid crystal panel 20.

The cable 20a may electrically connect the control assembly 50 and the power assembly 60 to the driver IC 30, and may also electrically connect the driver IC 30 to the liquid crystal panel 20. The cable 20a may include a flexible flat cable or a film cable that is bendable.

The driver IC 30 may receive image data and power from the control assembly 50 and the power assembly 60 through the cable 20a. The driver IC 30 may transmit the image data and driving current to the liquid crystal panel 20 through the cable 20a.

In addition, the cable 20a and the driver IC 30 may be integrally implemented as a film cable, a chip on film (COF), or a tape carrier package (TCP). In other words, the driver IC 30 may be arranged on the cable 20b. However, the disclosure is not limited thereto, and the driver IC 30 may be arranged on the liquid crystal panel 20.

The control assembly 50 may include a control circuit configured to control an operation of the liquid crystal panel 20 and the light source apparatus 100. The control circuit may process image data received from an external content source, transmit the image data to the liquid crystal panel 20, and transmit dimming data to the light source apparatus 100.

The power assembly 60 may supply power to the liquid crystal panel 20 and the light source apparatus 100 to allow the light source apparatus 100 to output surface light and to allow the liquid crystal panel 20 to block or transmit the light of the light source apparatus 100.

The light source apparatus 100 may include a point light source configured to emit monochromatic light and/or white light. The light source apparatus 100 may refract, reflect, and scatter light in order to convert light, which is emitted from the point light source, into uniform surface light. For example, the light source apparatus 100 may include a plurality of light sources configured to emit monochromatic light or white light, a diffuser plate configured to diffuse light incident from the plurality of light sources, a reflective sheet configured to reflect light emitted from the plurality of light sources and a rear surface of the diffuser plate, and an optical sheet configured to refract and scatter light emitted from a front surface of the diffuser plate.

As mentioned above, the light source apparatus 100 may refract, reflect, and scatter light emitted from the light source, thereby emitting uniform surface light toward the front side.

A configuration of the light source apparatus 100 will be described in more detail below.

Figure 3:
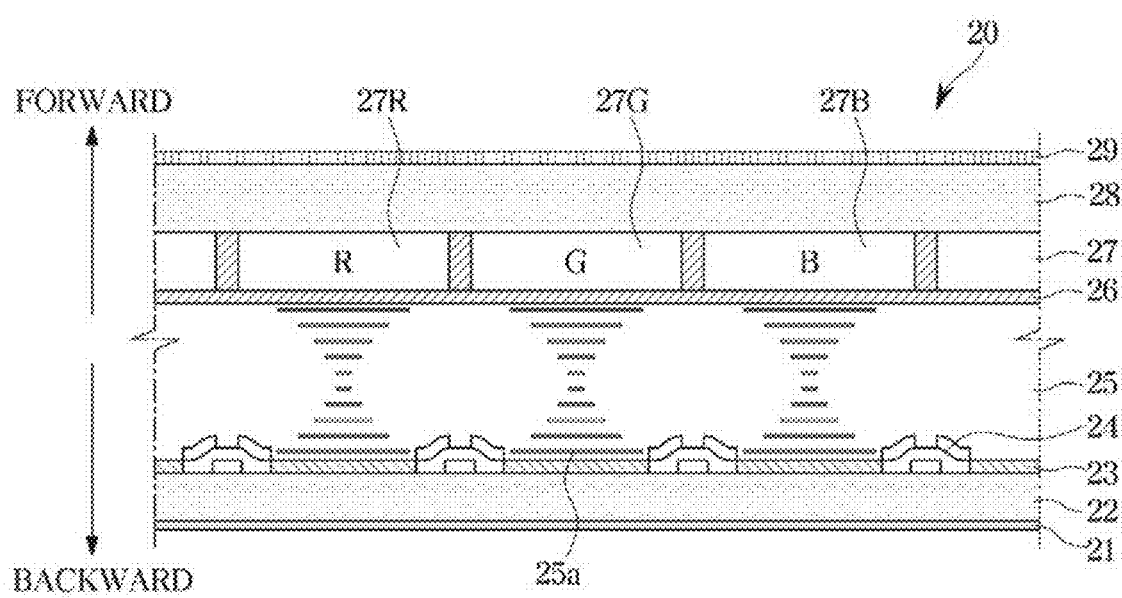
FIG. 3 is a side sectional view of a liquid crystal panel of the display apparatus, according to an embodiment.

FIG. 3 is a side sectional view of a liquid crystal panel of the display apparatus, according to an embodiment.

The liquid crystal panel 20 is provided in front of the light source apparatus 100 and blocks or transmits light emitted from the light source apparatus 100 to form the image I.

A front surface of the liquid crystal panel 20 may form the screen 12 of the display apparatus 10 described above, and the liquid crystal panel 20 may form the plurality of pixels P. In the liquid crystal panel 20, the plurality of pixels P may independently block or transmit light from the light source apparatus 100, and the light transmitted through the plurality of pixels P may form the image I displayed on the screen 12.

For example, as shown in FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 are provided on the outside of the first and second transparent substrates 22 and 28.

Each of the first polarizing film 21 and the second polarizing film 29 may transmit a specific light beam and block other light beams. For example, the first polarizing film 21 transmits a light beam having a magnetic field vibrating in a first direction and blocks other light beams. In addition, the second polarizing film 29 transmits a light beam having a magnetic field vibrating in a second direction and blocks other light beams. In this case, the first direction and the second direction may be perpendicular to each other. Accordingly, a polarization direction of the light transmitted through the first polarizing film 21 and a vibration direction of the light transmitted through the second polarizing film 29 are perpendicular to each other. As a result, in general, light may not pass through the first polarizing film 21 and the second polarizing film 29 at the same time.

The color filter 27 may be provided on an inside side of the second transparent substrate 28.

The color filter 27 may include a red filter 27R transmitting red light, a green filter 27G transmitting green light, and a blue filter 27G transmitting blue light. The red filter 27R, the green filter 27G, and the blue filter 27B may be disposed parallel to each other. A region, in which the color filter 27 is formed, corresponds to the pixel P described above. A region, in which the red filter 27R is formed, corresponds to the red sub-pixel $P_R$; a region, in which the green filter 27G is formed, corresponds to the green sub-pixel $P_G$; and a region, in which the blue filter 27B is formed, corresponds to the blue sub-pixel $P_B$.

The pixel electrode 23 may be provided on an inside side of the first transparent substrate 22, and the common electrode 26 may be provided on an inside side of the second transparent substrate 28.

The pixel electrode 23 and the common electrode 26 may be formed of a metal material through which electricity is conducted, and the pixel electrode 23 and the common electrode 26 may generate an electric field to change the arrangement of liquid crystal molecules 25a forming the liquid crystal layer 25 to be described below.

The pixel electrode 23 and the common electrode 26 may be formed of a transparent material, and may transmit light incident from the outside. For example, the pixel electrode 23 and the common electrode 26 may include indium tin oxide (ITO), indium zinc oxide (IZO), silver nanowire (Ag nano wire), carbon nanotube (CNT), graphene, or poly (3,4-ethylenedioxythiophene: PEDOT).

The thin film transistor (TFT) 24 is provided on an inside of the second transparent substrate 22.

The TFT 24 may transmit or block a current flowing through the pixel electrode 23. For example, an electric field may be formed or removed between the pixel electrode 23 and the common electrode 26 in response to turning on (closing) or turning off (opening) the TFT 24.

The TFT 24 may be formed of poly-silicon, and may be formed by semiconductor processes, such as lithography, deposition, and ion implantation.

The liquid crystal layer 25 is formed between the pixel electrode 23 and the common electrode 26, and the liquid crystal layer 25 is filled with the liquid crystal molecules 25a.

Liquid crystals represent an intermediate state between a solid (crystal) and a liquid. Most of the liquid crystal materials are organic compounds, and the molecular shape is in the shape of an elongated rod, and the orientation of molecules is in an irregular state in one direction, but in a regular state in other directions. As a result, the liquid crystal has both the fluidity of the liquid and the optical anisotropy of the crystal (solid).

In addition, liquid crystals also exhibit optical properties according to changes in an electric field. For example, in the liquid crystal, the orientation of molecules forming the liquid crystal may change according to a change in an electric field. In response to an electric field being generated in the liquid crystal layer 25, the liquid crystal molecules 25a of the liquid crystal layer 25 may be disposed along the direction of the electric field. In response to the electric field not being generated in the liquid crystal layer 25, the liquid crystal molecules 25a may be disposed irregularly and/or disposed along an alignment layer. As a result, the optical properties of the liquid crystal layer 25 may vary depending on the presence or absence of the electric field passing through the liquid crystal layer 25.

The control assembly 50 and the power assembly 60 may be implemented as a printed circuit board and various circuits mounted on the printed circuit board. For example, the power circuit may include a capacitor, a coil, a resistance element, a processor, and/or a power circuit board on which the capacitor, the coil, the resistance element, and the processor are mounted. Further, the control circuit may include a memory, a processor, and/or a control circuit board on which the memory and the processor are mounted.

Below, the light source apparatus 100 will be described.

Figure 4:
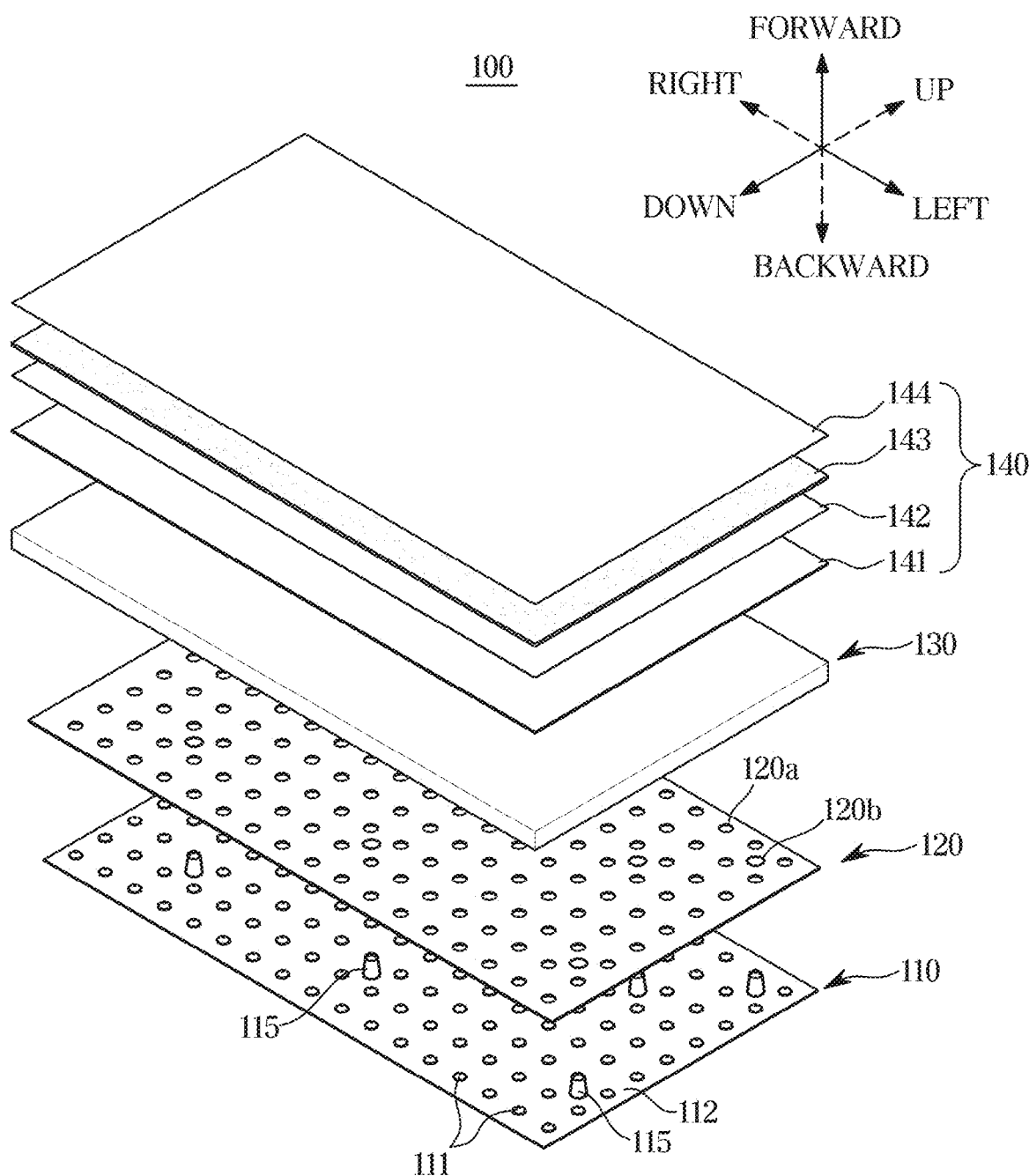
FIG. 4 is an exploded view of a light source apparatus, according to an embodiment.
Figure 5:
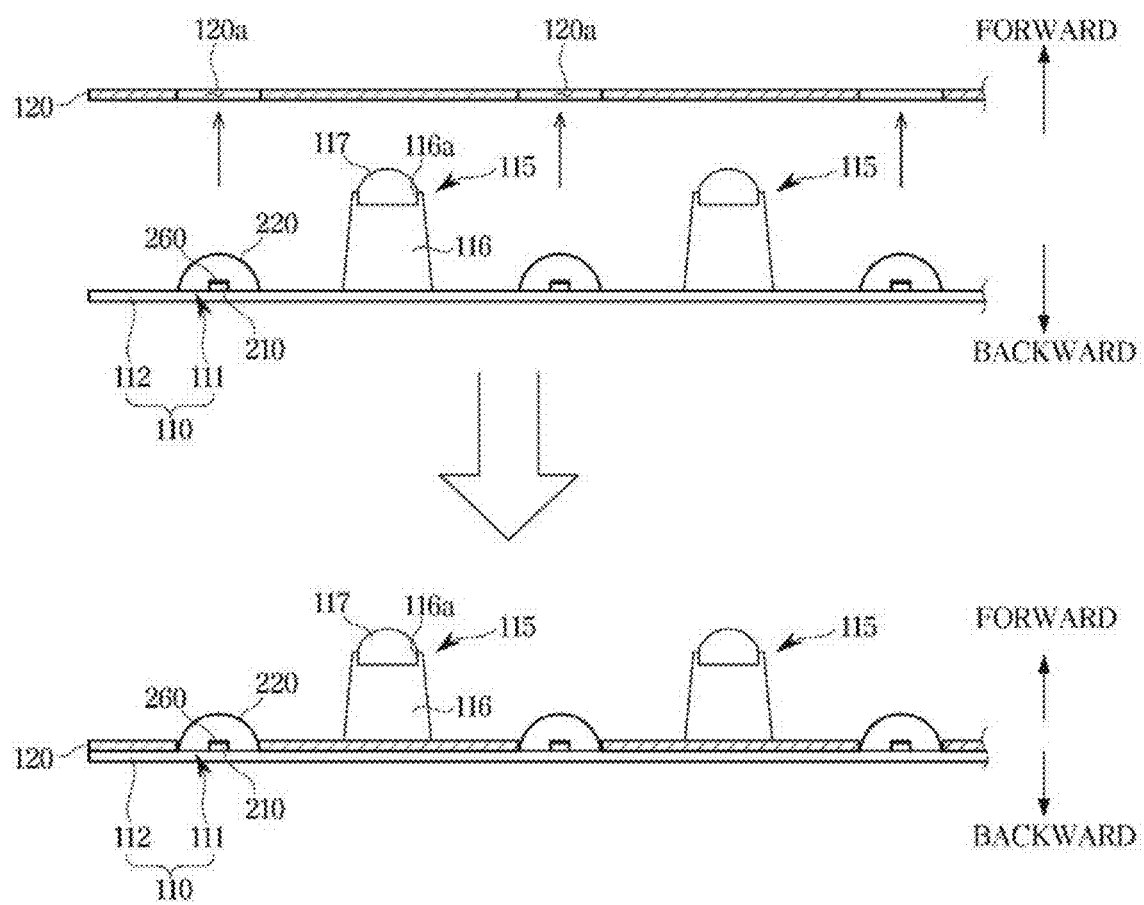
FIG. 5 is a view illustrating coupling between a light source module, and a reflective included in the light source apparatus sheet, according to an embodiment.

FIG. 4 is an exploded view of a light source apparatus, according to an embodiment. FIG. 5 is a view illustrating coupling between a light source module, and a reflective sheet included in the light source apparatus shown in FIG. 4, according to an embodiment.

The light source apparatus 100 includes a light source module 110 configured to generate light, a reflective sheet 120 configured to reflect light, a diffuser plate 130 configured to uniformly diffuse light, and an optical sheet 140 configured to improve a luminance of light that is emitted. The diffuser plate 130 and the optical sheet 140 may be referred to as optical members 130 and 140.

The light source module 110 may include a plurality of light sources 111 configured to emit light, and a substrate 112 provided to support/fix the plurality of light sources 111.

The plurality of light sources 111 may be disposed in a predetermined pattern to allow light to be emitted with uniform luminance. For example, the plurality of light sources 111 may be disposed in such a way that a distance between one light source and light sources adjacent thereto is the same.

For example, as shown in FIG. 4, the plurality of light sources 111 may be disposed in rows and columns. Accordingly, the plurality of light sources may be disposed such that an approximately square is formed by four adjacent light sources. In addition, any one light source may be disposed adjacent to four light sources, and a distance between one light source and four adjacent light sources may be approximately the same.

Alternatively, the plurality of light sources may be disposed in a plurality of rows, and a light source belonging to each row may be disposed at the center of two light sources belonging to an adjacent row. Accordingly, the plurality of light sources may be disposed such that an approximately equilateral triangle is formed by three adjacent light sources. In this case, one light source may be disposed adjacent to six light sources, and a distance between one light source and six adjacent light sources may be approximately the same.

However, the pattern in which the plurality of light sources 111 is disposed is not limited to the pattern described above, and the plurality of light sources 111 may be disposed in various patterns to allow light to be emitted with uniform luminance.

The light source 111 may employ an element configured to emit monochromatic light (light of a specific wavelength, e.g., blue light) or white light (e.g., light of a mixture of red light, green light, and blue light) in various directions by receiving power. For example, the light source 111 may include a light emitting diode (LED).

The substrate 112 may fix the plurality of light sources 111 to prevent a change in the position of the light source 111. Further, the substrate 112 may supply power, which is for the light source 111 to emit light, to the light source 111. The substrate 112 may be arranged behind the optical members 130 and 140.

The substrate 112 may fix the plurality of light sources 111 and may be configured with synthetic resin or tempered glass or a printed circuit board (PCB) on which a conductive power supply line for supplying power to the light source 111 is formed.

A supporter 115 may be installed on the substrate 112. The supporter 115 may be mounted on the substrate 112. The supporter 115 may be disposed between the optical members 130 and 140 and the substrate 112. The supporter 115 may support components disposed in front of the reflective sheet 120. The supporter 115 may support the diffuser plate 130 and/or the optical sheet 140. The supporter 115 may extend from the substrate 112. The supporter 115 may extend between the substrate 112 and the diffuser plate 130.

The supporter 115 may maintain an optical distance (OD) between the light source 111 and the diffuser plate 130 and/or the optical sheet 140 so as to maintain optical characteristics of the light source apparatus 100. The supporter 115 may be provided with a length capable of maintaining the optical characteristics of the light source apparatus 100.

The supporter 115 will be described later.

The reflective sheet 120 may reflect light emitted from the plurality of light sources 111 forward or in a direction close to the front.

In the reflective sheet 120, a plurality of through holes 120a may be formed at positions corresponding to each of the plurality of light sources 111 of the light source module 110. In addition, the light source 111 of the light source module 110 may pass through the through hole 120a and protrude to the front of the reflective sheet 120. The light source 111 may be disposed in the through hole 120a.

For example, as shown in the upper portion of FIG. 5, in the process of assembling the reflective sheet 120 and the light source module 110, the plurality of light sources 111 of the light source module 110 is inserted into the through holes 120a formed on the reflective sheet 120. Accordingly, as shown in the lower portion of FIG. 5, the substrate 112 of the light source module 110 may be disposed behind the reflective sheet 120, but at least one portion of the plurality of light sources 111 of the light source module 110 may be disposed in front of the reflective sheet 120.

Accordingly, the plurality of light sources 111 may emit light in front of the reflective sheet 120.

On the reflective sheet 120, a plurality of supporter holes 120b may be formed at a position corresponding to the supporter 150. The supporter 150 may pass through the supporter hole 120b and protrude so as to support the diffuser plate 130 and/or the optical sheet 140. The supporter 150 may be disposed in the supporter hole 120b.

The plurality of light sources 111 may emit light in various directions in front of the reflective sheet 120. The light may be emitted not only toward the diffuser plate 130 from the light source 111, but also toward the reflective sheet 120 from the light source 111. The reflective sheet 120 may reflect light, which is emitted toward the reflective sheet 120, toward the diffuser plate 130.

Light emitted from the light source 111 passes through various objects, such as the diffuser plate 130 and the optical sheet 140. Among incident light beams passing through the diffuser plate 130 and the optical sheet 140, some of the incident light beams are reflected from the surfaces of the diffuser plate 130 and the optical sheet 140. The reflective sheet 120 may reflect light that is reflected by the diffuser plate 130 and the optical sheet 140.

The diffuser plate 130 may be provided in front of the light source module 110 and the reflective sheet 120, and may evenly distribute the light emitted from the light source 111 of the light source module 110.

As described above, the plurality of light sources 111 is disposed in various places on the rear surface of the light source apparatus 100. Although the plurality of light sources 111 is disposed at equal intervals on the rear surface of the light source apparatus 100, unevenness in luminance may occur depending on the positions of the plurality of light sources 111.

Within the diffuser plate 130, the diffuser plate 130 may diffuse light emitted from the plurality of light sources 111 to remove unevenness in luminance caused by the plurality of light sources 111. In other words, the diffuser plate 130 may uniformly emit uneven light of the plurality of light sources 111 to the front surface.

The optical sheet 140 may include various sheets for improving luminance and luminance uniformity. For example, the optical sheet 140 may include a diffusion sheet 141, a first prism sheet 142, a second prism sheet 143, and a reflective polarizing sheet 144.

The diffusion sheet 141 diffuses light for the luminance uniformity. The light emitted from the light source 111 may be diffused by the diffuser plate 130 and may be diffused again by the diffusion sheet 141 included in the optical sheet 140.

The first and second prism sheets 142 and 143 may increase the luminance by condensing light diffused by the diffusion sheet 141. The first and second prism sheets 142 and 143 include a prism pattern in the shape of a triangular prism, and the prism pattern, which is provided in plurality, is disposed adjacent to each other to form a plurality of strips.

The reflective polarizing sheet 144 is a type of polarizing film and may transmit some of the incident light beams and reflect others for improving the luminance. For example, the reflective polarizing sheet 144 may transmit polarized light in the same direction as a predetermined polarization direction of the reflective polarizing sheet 144, and may reflect polarized light in a direction different from the polarization direction of the reflective polarizing sheet 144. In addition, the light reflected by the reflective polarizing sheet 144 is recycled inside the light source apparatus 100, and thus the luminance of the display apparatus 10 may be improved by the light recycling.

The optical sheet 140 is not limited to the sheet or film shown in FIG. 4, and may include more various sheets, such as a protective sheet, or films.

The light source apparatus 100 may include at least one of the diffuser plate 130, the diffusion sheet 141, the first prism sheet 142, the second prism sheet 143, and the reflective polarizing sheet 144.

Figure 6:
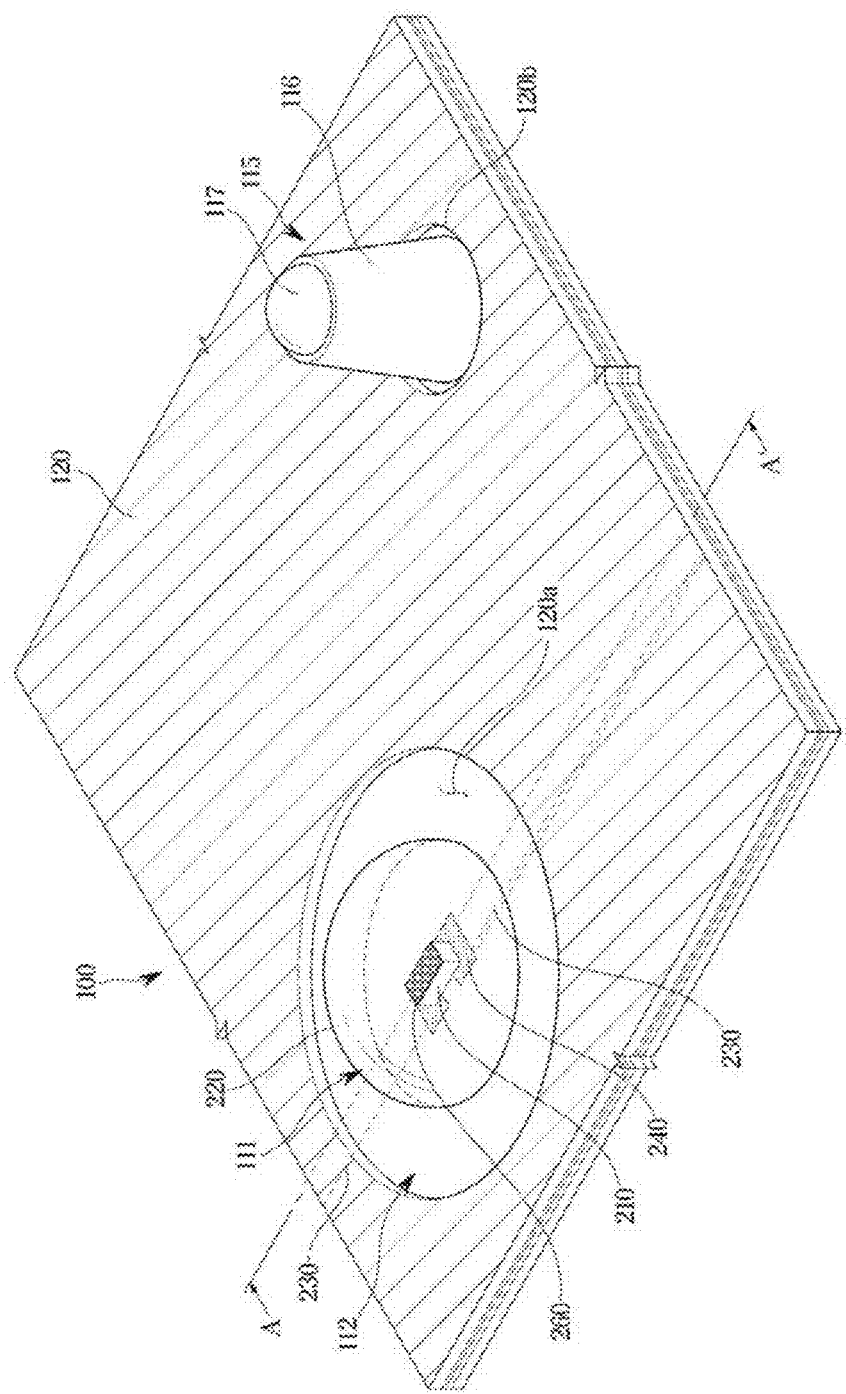
FIG. 6 is a perspective view of a light source and a supporter included in the light source apparatus, according to an embodiment.
Figure 7:
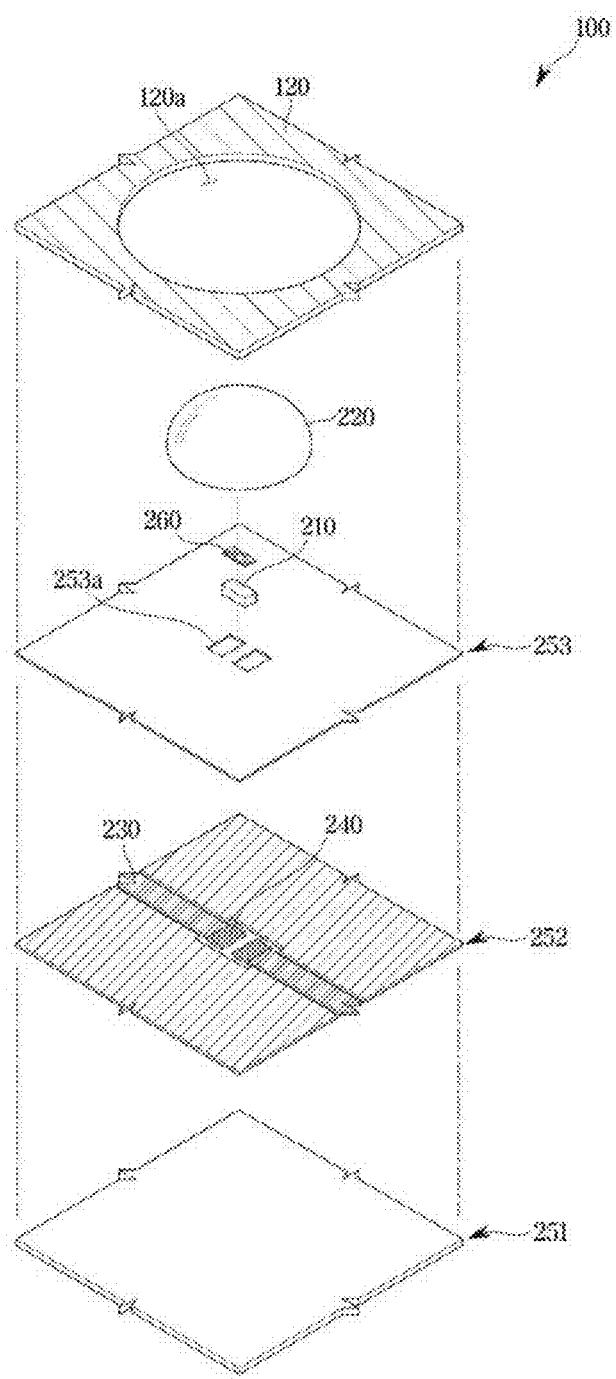
FIG. 7 is an exploded view of the light source, according to an embodiment.
Figure 8:
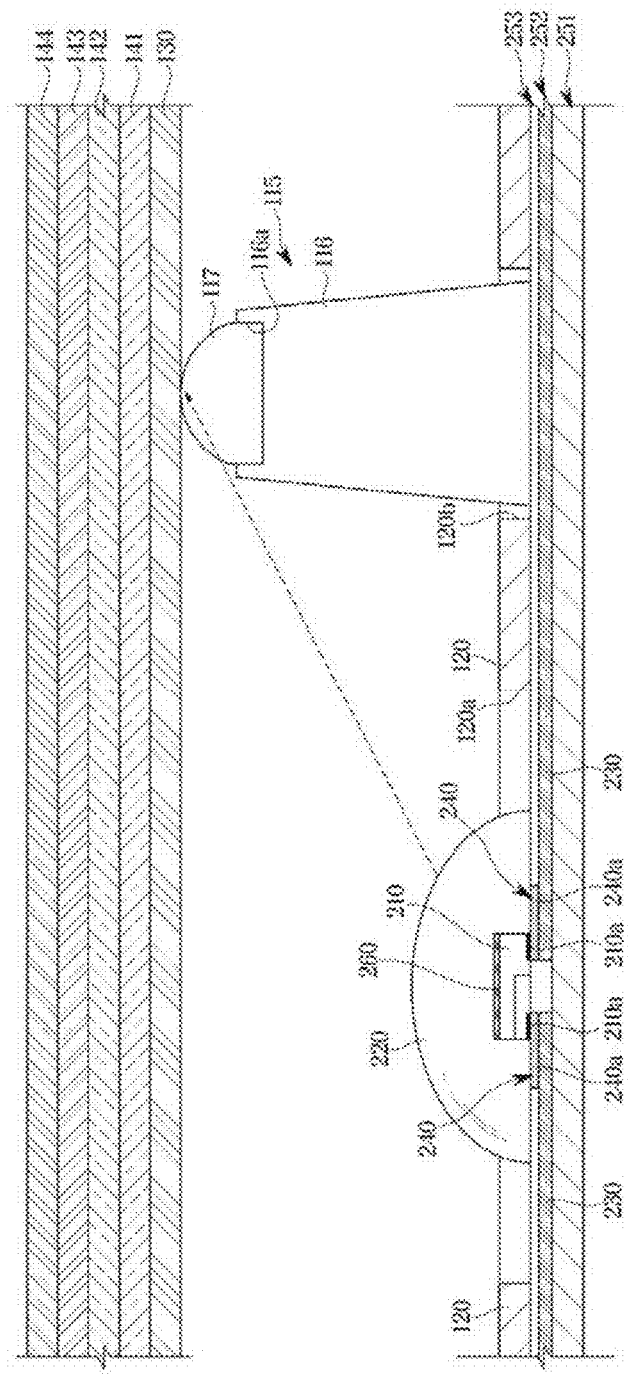
FIG. 8 is a cross-sectional view taken along line A-A' in FIG. 6, according to an embodiment.

FIG. 6 is a perspective view of a light source and a supporter included in the light source apparatus shown in FIG. 4, according to an embodiment. FIG. 7 is an exploded view of the light source shown in FIG. 6. FIG. 8 is a cross-sectional view taken along line A-A' shown in FIG. 6, according to an embodiment.

The light source 111 and the supporter 115 of the light source apparatus 100 will be described with reference to FIGS. 6 to 8.

As described above, the light source module 110 includes the plurality of light sources 111. The plurality of light sources 111 may protrude forward of the reflective sheet 120 from the rear of the reflective sheet 120 by passing through the through hole 120a. Accordingly, as shown in FIGS. 6 and 7, the light source 111 and a part of the substrate 112 may be exposed toward the front of the reflective sheet 120 through the through hole 120a.

The light source 111 may include an electrical/mechanical structure disposed in a region defined by the through hole 120a of the reflective sheet 120.

Each of the plurality of light sources 111 may include a light emitting diode 210, an optical dome 220, and a reflective layer 260.

The light emitting diode 210 may include a P-type semiconductor and an N-type semiconductor for emitting light by recombination of holes and electrons. In addition, the light emitting diode 210 is provided with a pair of electrodes 210a for supplying hole and electrons to the P-type semiconductor and the N-type semiconductor, respectively.

The light emitting diode 210 may convert electrical energy into optical energy. In other words, the light emitting diode 210 may emit light having a maximum intensity at a predetermined wavelength to which power is supplied. For example, the light emitting diode 210 may emit blue light having a peak value at a wavelength indicating blue (for example, a wavelength between 430 nm and 495 nm).

The light emitting diode 210 may be directly attached to the substrate 112 in a Chip On Board (COB) method. In other words, the light source 111 may include the light emitting diode 210 to which a light emitting diode chip or a light emitting diode die is directly attached to the substrate 112 without an additional packaging.

In order to reduce the size of the light source 111, the light source module 110, in which the flip-chip type light emitting diode 210 is attached to the substrate 112 in a chip-on-board method, may be manufactured.

On the substrate 112, a power supply line 230 and a power supply pad 240 for supplying power to the flip-chip type light emitting diode 210 is provided.

On the substrate 112, the power supply line 230 for supplying electrical signals and/or power to the light emitting diode 210 from the control assembly 50 and/or the power assembly 60 is provided.

As shown in FIG. 8, the substrate 112 may be formed by alternately laminating an insulation layer 251 that is non-conductive and a conduction layer 252 that is conductive. The conduction layer 252 may be disposed between the insulation layer 251 and a protection layer 253.

A line or pattern, through which power and/or electrical signals pass, is formed on the conduction layer 252. The conduction layer 252 may be formed of various materials having an electrical conductivity. For example, the conduction layer 252 may be formed of various metal materials, such as copper (Cu), tin (Sn), aluminum (Al), or an alloy thereof.

A dielectric of the insulation layer 251 may insulate between lines or patterns of the conduction layer 252. The insulation layer 251 may be formed of a dielectric for electrical insulation, such as FR-4.

The power supply line 230 may be implemented by a line or pattern formed on the conduction layer 252.

The power supply line 230 may be electrically connected to the light emitting diode 210 through the power supply pad 240.

The power supply pad 240 may be formed in such a way that the power supply line 230 is exposed to the outside.

The protection layer 253 configured to prevent or suppress damages caused by an external impact and/or damages caused by a chemical action (for example, corrosion, etc.) and/or damages caused by an optical action, to the substrate 112 may be formed in the substrate 112. The protection layer 253 may be provided on one side, facing the light source 111, of the substrate 112. The protection layer 253 may include a photo solder resist (PSR).

As shown in FIG. 8, the protection layer 253 may cover the power supply line 230 to prevent the power supply line 230 from being exposed to the outside.

For electrical contact between the power supply line 230 and the light emitting diode 210, a window 253a may be formed in the protection layer 253 to expose a portion of the power supply line 230 to the outside. A portion of the power supply line 230 exposed to the outside through the window 253a of the protection layer 253 may form the power supply pad 240.

A conductive adhesive material 240a for the electrical contact between the power supply line 230 exposed to the outside and the electrode 210a of the light emitting diode 210 is applied to the power supply pad 240. The conductive adhesive material 240a may be applied within the window 253a of the protection layer 253. The window 253a may be formed to allow the power supply pad 240 to be electrically connected to the light emitting diode 210.

The electrode 210a of the light emitting diode 210 may be in contact with the conductive adhesive material 240a, and the light emitting diode 210 may be electrically connected to the power supply line 230 through the conductive adhesive material 240a.

The conductive adhesive material 240a may include a solder having an electrical conductivity. However, the disclosure is not limited thereto, and the conductive adhesive material 240a may include electrically conductive epoxy adhesives.

Power may be supplied to the light emitting diode 210 through the power supply line 230 and the power supply pad 240, and in response to the supply of the power, the light emitting diode 210 may emit light. A pair of power supply pads 240 corresponding to each of the pair of electrodes 210a provided in the flip chip type light emitting diode 210 may be provided.

The optical dome 220 may cover the light emitting diode 210. The optical dome 220 may prevent or suppress damages to the light emitting diode 210 caused by an external mechanical action and/or damage to the light emitting diode 210 caused by a chemical action. The optical dome 220 may be spaced apart from the reflective sheet 120.

The optical dome 220 may have a dome shape formed in such a way that a sphere is cut into a surface not including the center thereof, or may have a hemispherical shape in such a way that a sphere is cut into a surface including the center thereof. A vertical cross section of the optical dome 220 may be a bow shape or a semicircle shape.

The optical dome 220 may be formed of silicone or epoxy resin. For example, the molten silicon or epoxy resin may be discharged onto the light emitting diode 210 through a nozzle, and the discharged silicon or epoxy resin may be cured, thereby forming the optical dome 220.

Accordingly, the shape of the optical dome 220 may vary depending on the viscosity of the liquid silicone or epoxy resin. For example, in a state in which the optical dome 220 is manufactured using silicon having a thixotropic index of about 2.7 to 3.3 (appropriately, 3.0), the optical dome 220 may include a dome ratio indicating a ratio of a height of a dome to a diameter of a base of the dome (a height of the dome/a diameter of the base) of approximately 0.25 to 0.31 (appropriately 0.28). For example, the optical dome 220 formed of silicon having a thixotropic index of approximately 2.7 to 3.3 (appropriately, 3.0) may have a diameter of a base of approximately 2.5 mm and a height of approximately 0.7 mm.

The optical dome 220 may be optically transparent or translucent. Light emitted from the light emitting diode 210 may be emitted to the outside by passing through the optical dome 220.

In this case, the dome-shaped optical dome 220 may refract light like a lens. For example, light emitted from the light emitting diode 210 may be refracted by the optical dome 220 and thus may be dispersed.

As mentioned above, the optical dome 220 may disperse light emitted from the light emitting diode 210 as well as protecting the light emitting diode 210 from external mechanical and/or chemical or electrical actions.

The reflective layer 260 may be disposed in front of the light emitting diode 210. The reflective layer 260 may be disposed on the front surface of the light emitting diode 210. The reflective layer 260 may be a multilayer reflective structure in which a plurality of insulation layers having different refractive indices is alternately laminated. For example, the multilayer reflective structure may be a Distributed Bragg Reflector (DBR) in which a first insulation layer having a first refractive index and a second insulation layer having a second refractive index are alternately laminated.

The supporter 115 may include a supporter body 116 and a protective member 117.

The supporter body 116 may be installed on the substrate 112. The supporter body 116 may be mounted on the substrate 112.

The supporter body 116 may include a material having rigidity for supporting the diffuser plate 130 and/or the optical sheet 140 disposed in front of the reflective sheet 120. The supporter body 116 may be formed of an epoxy material having a hardness. The supporter body 116 may include a material having a higher strength than the protective member 117. The supporter body 116 may have a white color having a relatively high reflectance, in order to prevent the generation of Mura defect in the display apparatus 10.

The supporter body 116 may have a columnar shape in which an area of a surface facing the substrate 112 is different from an area of a surface facing the diffuser plate 130. The supporter body 116 may have a columnar shape in which a cross-sectional area, along a direction, in which the substrate 112 extends, is reduced from a portion adjacent to the substrate 112 toward the diffuser plate 130.

Based on the supporter body 116 having a cylindrical shape, in which an area of a surface facing the substrate 112 is the same as an area of a surface facing the diffuser plate 130, a portion of the light emitted from the light emitting diode 210 may be reflected by a portion, which is adjacent to the diffuser plate 130, of the supporter body 116, thereby generating a Mura defect.

Because the supporter body 116 according to the disclosure has a columnar shape in which a cross-sectional area, along a direction, in which the substrate 112 extends, is reduced from a portion adjacent to the substrate 112 toward the diffuser plate 130, it is possible to reduce an amount of light that is a part of light emitted from the light emitting diode 210 and that is reflected by a portion, which is close to the diffuser plate 130, of the supporter body 116 and thus it is possible to reduce the generation of Mura defect.

The supporter body 116 may include a body groove 116a formed at a front end thereof. The body groove 116a may receive the protective member 117. The body groove 116a may be provided to correspond to the protective member 117.

The protective member 117 may be disposed at the front end of the supporter body 116. The protective member 117 may be disposed at one end facing the optical member 117. The protective member 117 may be disposed at one end, facing the diffuser plate 130, of the supporter body 116.

The protective member 117 may be provided to protect the light source apparatus 100 from a load applied to the diffuser plate 130 and/or the optical sheet 140 disposed in front of the reflective sheet 120. The protective member 117 may be provided to absorb an impact applied to the diffuser plate 130 and/or the optical sheet 140 disposed in front of the reflective sheet 120. The protective member 117 may prevent damage to the diffuser plate 130 and/or the optical sheet 140.

The protective member 117 may include a material having stretchability. The protective member 117 may include a material having elasticity. The protective member 117 may be formed of silicone or epoxy resin. The protective member 117 may be formed of a material having thixotrophy.

The protective member 117 may include a transparent or translucent material. The protective member 117 may be optically transparent or translucent. Light emitted from the light emitting diode 210 may pass through the protective member 117. The protective member 117 may have a substantially hemispherical shape protruding from the supporter body 116 toward the optical members 130 and 140.

The protective member 117 may include substantially the same material as the optical dome 220.

Figure 9:
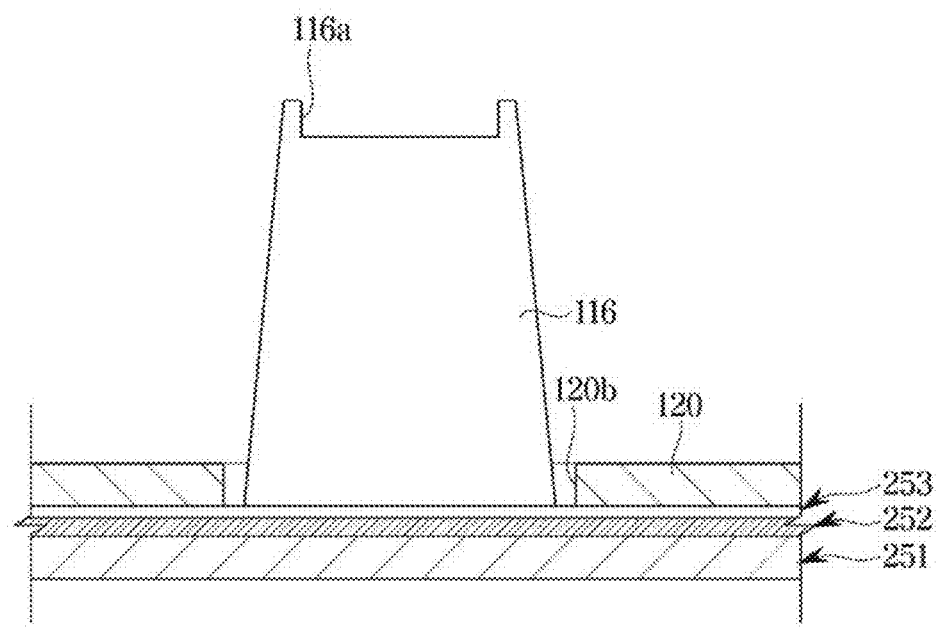
FIG. 9 is a view illustrating a state in which a supporter body of the supporter shown in FIG. 8, according to an embodiment.
Figure 10:
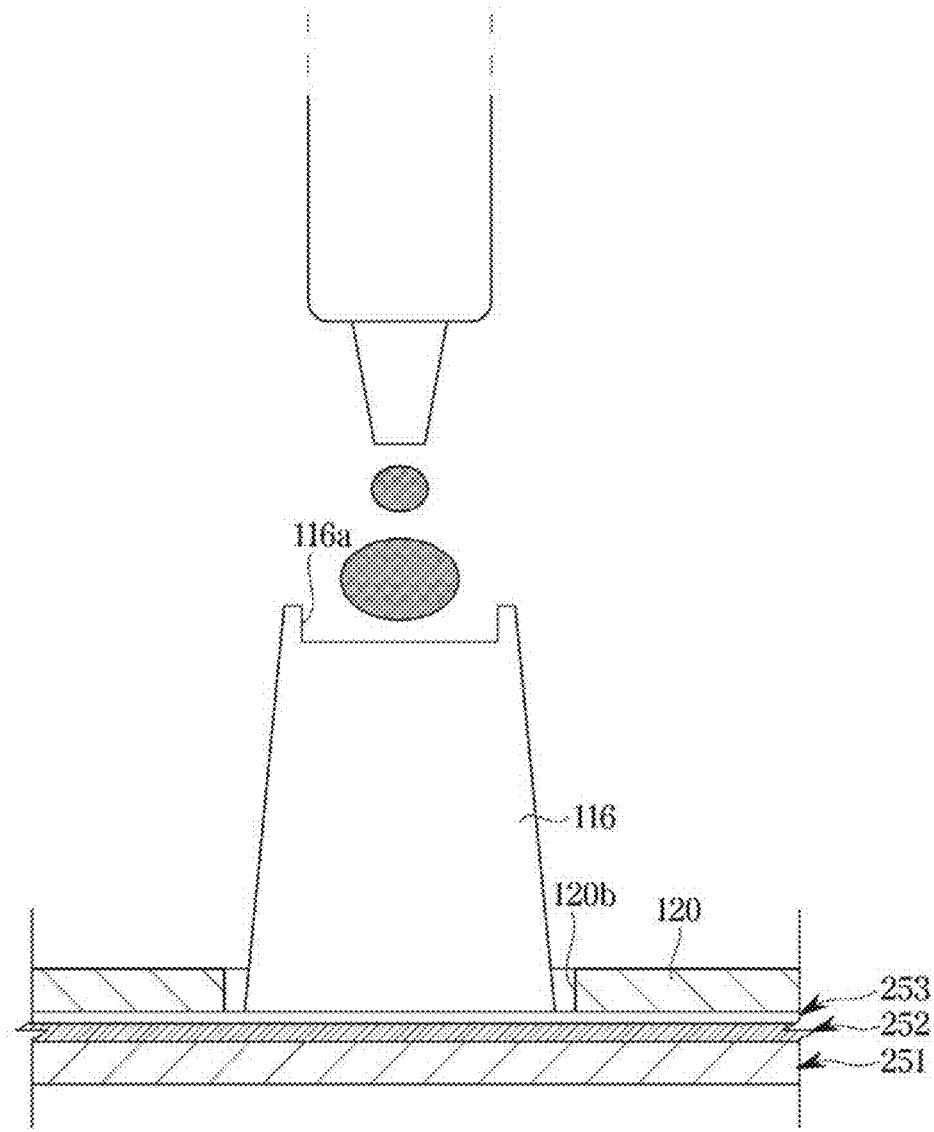
FIG. 10 is a view illustrating a state in which a protective member is formed on the supporter body shown in FIG. 9, according to an embodiment.

FIG. 9 is a view illustrating a state in which a supporter body of the supporter shown in FIG. 8 is provided, according to an embodiment. FIG. 10 is a view illustrating a state in which a protective member is formed on the supporter body shown in FIG. 9, according to an embodiment.

A manufacturing method of the supporter 115 will be described with reference to FIGS. 9 and 10.

Referring to FIG. 9, the supporter body 116 may be mounted on the substrate 112. The body groove 116a may be formed in the front end of the supporter body 116.

Referring to FIG. 10, molten silicone or epoxy resin may be discharged into the body groove 116a of the supporter body 116 through a nozzle or the like. As the discharged silicone or epoxy resin is cured, the protective member 117 may be formed as shown in FIG. 8. The protective member 117 may be cured in a dome shape.

A process of forming the protective member 117 in the supporter body 116 may proceed together with a process of forming the optical dome 220. As described above, because the protective member 117 includes the same material as the optical dome 220, it is possible to add the process of forming the protective member 117 to the process of forming the optical dome 220. As the process of forming the optical dome 220 and the process of forming the protective member 117 are performed together, the increase in the manufacturing process of the light source apparatus 100 may be minimized.

Figure 11:
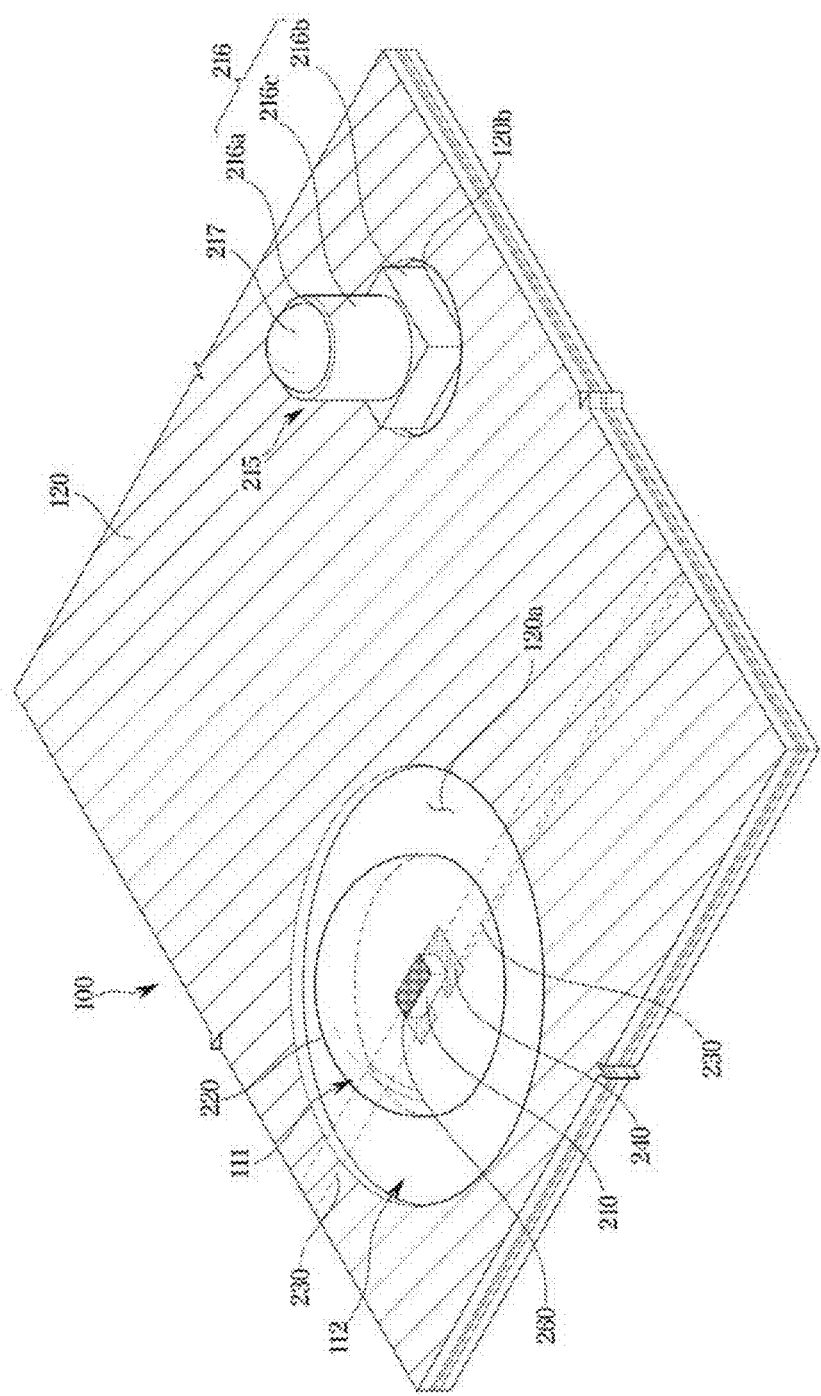
FIG. 11 is a perspective view of a light source and a supporter included in a light source apparatus according to an embodiment of the disclosure.

FIG. 11 is a perspective view of a light source and a supporter included in a light source apparatus, according to an embodiment of the disclosure.

A light source apparatus according to an embodiment of the disclosure will be described with reference to FIG. 11. The same reference numerals are assigned to the same components as those of the light source apparatus illustrated in FIG. 6, and detailed descriptions thereof may be omitted.

Referring to FIG. 11, a light source apparatus 200 may include a supporter 215 having a shape different from that of the light source apparatus 100 illustrated in FIG. 6. The supporter 215 may include a supporter body 216 and a protective member 217.

The supporter body 216 may be installed on the substrate 112. The supporter body 216 may be mounted on the substrate 112.

The supporter body 216 may include a material having rigidity for supporting the diffuser plate 130 and/or the optical sheet 140 disposed in front of the reflective sheet 120. The supporter body 216 may be formed of an epoxy material having a hardness. The supporter body 216 may include a material having a higher strength than the protective member 217. The supporter body 216 may have a white color having a relatively high reflectance, in order to prevent the generation of Mura defect in the display apparatus 10.

The supporter body 216 may have a columnar shape in which an area of a surface facing the substrate 112 is different from an area of a surface facing the diffuser plate 130. The supporter body 216 may include a first body 216b disposed adjacent to the substrate 112 and a second body 216c disposed in front of the first body 216b. The second body 216c may be disposed to be spaced apart from the substrate 112 than the first body 216b.

A cross-sectional area of the first body 216b along a direction, in which the substrate 112 extends may be greater than a cross-sectional area of the second body 216c along a direction, in which the substrate 112 extends. In other words, the cross-sectional area of the second body 216c may be less than the cross-sectional area of the first body 216b. The first body 216b may have a substantially quadrangular prism shape. The second body 216c may have a substantially cylindrical shape.

As for the supporter body 216 according to the disclosure, the cross-sectional area of the second body 216c disposed to be spaced apart from the substrate 112 may be less than the cross-sectional area of the first body 216b disposed close to the substrate 112, and the second body 216c may have a substantially cylindrical shape. Therefore, it is possible to reduce an amount of light that is a part of light emitted from the light emitting diode 210 and that is reflected by a portion, which is close to the diffuser plate 130, of the supporter body 216, and thus it is possible to reduce the generation of Mura defect.

The supporter body 216 may include a body groove 216a formed at a front end thereof. The body groove 216a may receive the protective member 217. The body groove 216a may be provided to correspond to the protective member 217.

The protective member 217 may be disposed at the front end of the supporter body 216. The protective member 217 may be disposed at one end facing the optical member 217. The protective member 217 may be disposed at one end, facing the diffuser plate 130, of the supporter body 216.

The protective member 217 may be provided to protect the light source apparatus 200 from a load applied to the diffuser plate 130 and/or the optical sheet 140 disposed in front of the reflective sheet 120. The protective member 217 may be provided to absorb an impact applied to the diffuser plate 130 and/or the optical sheet 140 disposed in front of the reflective sheet 120. The protective member 217 may prevent damage to the diffuser plate 130 and/or the optical sheet 140.

The protective member 217 may include a material having stretchability. The protective member 217 may include a material having elasticity. The protective member 217 may be formed of silicone or epoxy resin. The protective member 217 may be formed of a material having thixotrophy.

The protective member 217 may include a transparent or translucent material. The protective member 217 may be optically transparent or translucent. Light emitted from the light emitting diode 210 may pass through the protective member 217. The protective member 217 may have a substantially hemispherical shape protruding from the supporter body 216 toward the optical members 130 and 140.

The protective member 217 may include substantially the same material as the optical dome 220.

As is apparent from the above description, a display apparatus and a light source apparatus thereof may prevent damage to an optical member because a supporter includes a protective member having stretchability and/or elasticity.

Further, a display apparatus and a light source apparatus thereof may reduce a Mura defect because a supporter includes a protective member provided to allow light to pass therethrough.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A light source apparatus comprising:
    an optical member;
    a substrate disposed on a first side of the optical member; and
    a supporter disposed between the optical member and the substrate,
    wherein the supporter comprises:
        a supporter body on the substrate, comprising a body groove at a first end of the supporter body that is nearest to the optical member; and
        a protective member disposed in the body groove, the protective member comprising a material having at least one of stretchability or elasticity, and
        wherein a portion of the protective member is received inside the body groove, and another portion of the protective member protrudes from the body groove to the optical member.

2. The light source apparatus of claim 1, wherein the supporter body comprises a material having a strength that is greater than a strength of the material of the protective member.

3. The light source apparatus of claim 1, wherein the material of the protective member has thixotrophy.

4. The light source apparatus of claim 1, wherein the protective member comprises at least one of a transparent material or a translucent material.

5. The light source apparatus of claim 1, wherein the supporter body comprises a columnar shape in which a cross-sectional area, along a direction in which the substrate extends, is reduced from the substrate toward the optical member.

6. The light source apparatus of claim 1, wherein the supporter body comprises:
    a first supporter disposed adjacent to the substrate; and
    a second supporter spaced a first distance from the substrate, the second supporter comprising a cross-sectional area less than a cross-sectional area of the first supporter along a direction in which the substrate extends.

7. The light source apparatus of claim 1, further comprising:
    a light emitting diode mounted on the substrate; and
    an optical dome configured to cover the light emitting diode, the optical dome comprising a material that is same as the material of the protective member.

8. The light source apparatus of claim 7, wherein
the protective member is configured to allow the light emitted from the light emitting diode to pass through.

9. The light source apparatus of claim 7, further comprising:
a reflective sheet disposed on a first side of the substrate, the reflective sheet comprising a through hole formed to correspond to the optical dome and a supporter hole formed to correspond to the supporter.

10. The light source apparatus of claim 1, wherein
the optical member comprises at least one of a diffuser plate, a diffusion sheet, a prism sheet, or a reflective polarizing sheet.

11. The light source apparatus of claim 1, wherein
the protective member comprises a hemispherical shape protruding from the supporter body toward the optical member.

12. A display apparatus comprising:
a bottom chassis;
a substrate on the bottom chassis;
a light emitting diode mounted on the substrate;
an optical dome configured to cover the light emitting diode;
an optical member disposed on a first side of the substrate; and
a supporter disposed between the optical member and the substrate,
wherein the supporter comprises:
   a supporter body on the substrate, comprising a body groove at a first end of the supporter body that is nearest to the optical member; and
   a protective member disposed in the body groove, the protective member comprising a material that is same as a material of the optical dome, and
   wherein a portion of the protective member is received inside the body groove, and another portion of the protective member protrudes from the body groove to the optical member.

13. The display apparatus of claim 12, wherein
the supporter body comprises a material having a strength that is greater a strength of a the material of the protective member.

14. The display apparatus of claim 12, wherein
the material of the protective member has thixotrophy.

15. A light source apparatus comprising:
an optical member;
a light emitting diode disposed between the optical member and a substrate;
a supporter disposed between the optical member and the substrate,
wherein the supporter comprises:
   a supporter body, comprising a body groove at a first end of the supporter body that is nearest to the optical member; and
   a protective member disposed at the first end of the supporter body that is nearest to the optical member, and
   wherein a portion of the protective member is received inside the body groove, and another portion of the protective member protrudes from the body groove to the optical member.

16. The light source apparatus of claim 15, further comprising:
a reflective sheet disposed on a first side of the substrate; and
an optical dome spaced a first distance from the reflective sheet, wherein the optical dome is configured to enclose the light emitting diode.

17. The light source apparatus of claim 16, wherein a material of the optical dome comprises at least one of a silicone or a resin.

18. The light source apparatus of claim 15,
wherein the supporter body comprises a first supporter body and a second supporter body, and wherein the first supporter body comprises a different geometric shape than the second supporter body.

19. The light source apparatus of claim 18, wherein the first supporter body is a rectangular shape and the second supporter body is a cylindrical shape.

* * * * *